(12) United States Patent
Xiang et al.

(10) Patent No.: US 12,179,413 B2
(45) Date of Patent: Dec. 31, 2024

(54) PREPARATION METHOD OF PTFE-BASED MEMBRANE FOR PREVENTING AND REMOVING ICES COVERING WIND TURBINE BLADES AND USE THEREOF

(71) Applicants: CHINA THREE GORGES CORPORATION, Beijing (CN); CHINA THREE GORGES RENEWABLES (GROUP) CO., LTD., Beijing (CN); NANJING HAOHUI HI TECH CO., LTD., Jiangsu (CN)

(72) Inventors: Xin Xiang, Beijing (CN); Jianping Liu, Beijing (CN); Jianhua Wu, Jiangsu (CN); Zhiyu Sun, Beijing (CN); Yawei Zhu, Jiangsu (CN); Wenwei Li, Beijing (CN); Fangliang Zhao, Beijing (CN); Hong Wu, Jiangsu (CN); Jingxin Zhao, Jiangsu (CN); Bo Pang, Beijing (CN); Jianping Wu, Jiangsu (CN)

(73) Assignees: CHINA THREE GORGES CORPORATION (CN); CHINA THREE GORGES RENEWABLES (GROUP) CO., LTD. (CN); NANJING HAOHUI HI TECH CO., LTD. (CN)

( * ) Notice: Subject to any disclaimer, the term of this patent is extended or adjusted under 35 U.S.C. 154(b) by 0 days.

(21) Appl. No.: 17/640,284

(22) PCT Filed: Dec. 15, 2020

(86) PCT No.: PCT/CN2020/136608
§ 371 (c)(1),
(2) Date: Mar. 3, 2022

(87) PCT Pub. No.: WO2022/011962
PCT Pub. Date: Jan. 20, 2022

(65) Prior Publication Data
US 2023/0256665 A1 Aug. 17, 2023

(30) Foreign Application Priority Data
Nov. 5, 2020 (CN) .................. 202011221352.1

(51) Int. Cl.
B29C 43/24 (2006.01)
B29C 48/00 (2019.01)
(Continued)

(52) U.S. Cl.
CPC .......... *B29C 63/0017* (2013.01); *B29C 43/24* (2013.01); *B29C 48/0019* (2019.02);
(Continued)

(58) Field of Classification Search
CPC . B29C 43/24; B29C 48/0011; B29C 48/0019; B29C 48/022; B29C 48/06;
(Continued)

(56) References Cited

U.S. PATENT DOCUMENTS 4,764,560 A * 8/1988 Mitchell .................. C08L 27/18
524/506

FOREIGN PATENT DOCUMENTS

CN 106313812 A * 1/2017

* cited by examiner

*Primary Examiner* — Michael A Tolin

(57) ABSTRACT

A preparation method of a polytetrafluoroethylene (PTFE)-based membrane for preventing and removing ices covering wind turbine blades is provided and the method comprises: preparing a membrane into a PTFE rod material with polymerized monomers by using monomer polymerization methods such as blending, pre-compressing and pushing; making the membrane into a PTFE-based homogeneous membrane with micropores and nano and micron scale (Continued)

Pasting of membrane on tip of blade after cutting concave-convex geometrical ultra-structure morphologies under the condition that the membrane is cracked to generate a laminar exfoliated fabric-like structure in the hot calendaring process of the PTFE rod material by using a hot calendaring and fusion polymerization method; and applying the PTFE-based homogeneous membrane to blades of a large wind turbine in operation.

6 Claims, 8 Drawing Sheets

(51) Int. Cl.
- *B29C 53/58* (2006.01)
- *B29C 63/00* (2006.01)
- *B29C 63/06* (2006.01)
- *B29C 63/48* (2006.01)
- *B29C 65/00* (2006.01)
- *B29C 65/78* (2006.01)
- *B29K 27/18* (2006.01)
- *B29L 31/08* (2006.01)
- *B32B 37/00* (2006.01)
- *F03D 80/40* (2016.01)
- *B32B 38/00* (2006.01)

(52) U.S. Cl.
CPC ........ *B29C 53/581* (2013.01); *B29C 63/0073* (2013.01); *B29C 63/06* (2013.01); *B29C 65/7805* (2013.01); *B29C 65/7832* (2013.01); *B29C 66/02245* (2013.01); *B32B 37/003* (2013.01); *F03D 80/40* (2016.05); *B29C 2063/485* (2013.01); *B29K 2027/18* (2013.01); *B29L 2031/085* (2013.01); *B32B 2038/0016* (2013.01); *B32B 2327/18* (2013.01); *B32B 2603/00* (2013.01); *F05B 2230/90* (2013.01); *F05B 2280/4005* (2013.01); *F05B 2280/6011* (2013.01)

(58) Field of Classification Search
CPC ..... B29C 48/288; B29C 53/56; B29C 53/564; B29C 53/58; B29C 53/581; B29C 63/0017; B29C 63/0073; B29C 63/02; B29C 63/04; B29C 63/06; B29C 63/08; B29C 63/10; B29C 63/48; B29C 63/481; B29C 2063/027; B29C 2063/485; B29C 65/50; B29C 65/7802; B29C 65/7805; B29C 65/7817; B29C 65/7832; B29C 66/02245; B29C 73/04; B29C 73/10; B29D 7/01; B29K 2027/12; B29K 2027/18; B29K 2995/0093; B29L 2031/08; B29L 2031/082; B29L 2031/085; B32B 37/0007; B32B 37/003; B32B 2038/0016; B32B 2307/73; B32B 2327/12; B32B 2327/18; B32B 2603/00; C08G 77/20; C08J 5/18; C08J 2327/18; C08J 2327/22; C08L 27/18; C08L 27/22; C08L 43/04; C08L 83/04; C09K 3/18; F03D 1/0675; F03D 80/40; F05B 2230/90; F05B 2280/4005; F05B 2280/401; F05B 2280/6011; Y02E 10/72
See application file for complete search history.

Pasting of membrane on tip of blade after cutting

Winding and pasting of membrane

Pasting of membrane

Pasting of membrane at lightning arrester

Membrane pasting tool

Spreading of membrane

PREPARATION METHOD OF PTFE-BASED MEMBRANE FOR PREVENTING AND REMOVING ICES COVERING WIND TURBINE BLADES AND USE THEREOF

FIELD

The disclosure relates to the technical field of polymer composites, particularly to a preparation method of a polytetrafluoroethylene (PTFE)-based membrane for preventing and removing ices covering wind turbine blades, and use thereof.

BACKGROUND

China is a country with the fastest development speed and the largest installed capacity of wind power generation all over the world. However, it is also one of the countries with the widest wind turbine blade icing areas and the most frequent shutdown events of wind turbine generators caused by icing. Through the investigation of wind farms with frozen wind turbine blades in winter and the analysis of statistical data and relevant data of power generation loss of frozen blades in winter provided by some wind farms, the blades of wind turbine generators installed in China's high-altitude, mountainous and low-temperature, frozen and other areas are iced to different degrees in every winter due to being affected by climates, the wind turbine blades in high-altitude mountainous areas and forest areas with an altitude of 1000-1800 m are more seriously iced in winter. In particular, the blades in Hunan, Hubei, Guangdong, Jiangxi, Zhejiang, Anhui, Yunnan Guizhou Plateau, Inner Mongolia, mountainous areas in northern Hebei and northwest Shanxi are more serious in terms of icing time and icing degree than those in wind farms in Northern Xinjiang and Northeast China. The unit capacity of blade icing accounts for about 27% of China's cumulative total installed capacity. Winter is just the time when wind resources are abundant. In these areas with relatively serious icing degrees basically have no pressure problem that wind power is locally consumed. Therefore, abnormal operation of wind turbine generators caused by blade icing and the forced shutdown of the wind turbine caused by a fact that guaranteed power cannot be reached result in amazing lost electricity revenues, and even blade fracture events occurring due to icing.

Icing of blade surfaces and the deficiency of ice prevention and removal technical methods and efficiencies constitute the safety risk of unit operation in addition to directly affecting electricity revenues of wind power. Therefore, ice prevention and removal of the wind turbine blades in winter is a major subject in the wind power industry all over the world.

The wind turbine blade is an important component of a wind turbine generator. Icing of blades can lead to frequent shutdown events of wind turbines in winter to lose a plenty of generated electricity and its electricity revenues and causes change in aerodynamic performance of the blades to result in a fact that the power of the wind turbine is lost; ice load can affect the load of the unit, the uneven ice load distribution causes reduction in the power of the generator; the airfoil filament line of the blade is destroyed, the unbalance ice load can lead to reduction in fatigue resistance of the blade; the difference between thicknesses of the iced sections can vary the original airfoil of the blade to influence the service life of the generator, and increase the roughness of the surface of the blade to seriously affect the airfoil aerodynamic performance of the blade; serious icing causes the rupture of the blade to form the safe operation risk of the generator; the generator continues to operate under the state of icing, which leads to a fact that the generator is disconnected from a grid so as to affect the safety of a power grid; when ices are separated from the blade at a natural temperature or when being fused, the blade being in rotation can throw ices at a distance of more than 100 meters at any time so as to bring a potential safety hazard to people's lives and properties around the wind turbine generator.

There are multiple technical methods for preventing and removing ices at home and abroad, including two categories, namely, a technical method measure for passively preventing and removing ices (such as mechanical deicing, liquid deicing and coating deicing) and a technical method measure for actively preventing and removing ices (hot gas deicing, microwave deicing, electric deicing, ultrasonic deicing, etc.). For example, Goldwind Technology has developed an electro-thermal deicing technology in which heating elements such as a carbon fiber electro-thermal membranes or resistance wires are embedded in the coating of the blade to constitute a metal heating mesh, and an deicing and heating cabinet, a measurement and control cabinet, a power supply, an overheating protection converter and the like are additionally arranged in the hub of the blade to constitute an electro-thermal ice prevention and removal system, so as to achieve the effects of fusing the ices on the surface of the blade via electrical heating temperature and preventing the surface of the blade from being iced. Yunda Wind Power has developed an electrical heating hot air device installed in the hub of the blade of the wind turbine in which a hot gas ventilation pipe is arranged in the cavity of the blade so that the hot gas circulates in the ventilation pipe, the hot gas is introduced into the cavity of the blade to deliver the heat to the outer surface of the blade through the shell of the blade so that the blade has a certain temperature, and is indirectly heated under the action of the hot gas to prevent the sub-cooled water drops from being frozen, so as to achieve the purpose of preventing and removing ices. Wuhan shuneng can prepare $SiO_2$ into a porous multi-layer bionic icing-preventing coating which is in a micro-nano structure, has low surface energy substances and a modified surface rough structure, and is capable of forming lotus leaf-imitated surface energy that actively resists freezing rain, ice and snow disaster weather, and is used for hydrophobic, no-icing or reducing the icing amount of the blades of the wind turbine and a high-voltage grid system under a high-humidity environment.

The above technical methods are typical technical methods for preventing and removing ices on many wind turbine blades at home and abroad at present. However, practices show that all of those methods have the problem that the ideal ice prevention and removal effect cannot be realized, and some methods can even cause the potential safety hazard of the wind turbine generator and its blades.

For example, an electric heating deicing system using an electric heating membrane or resistance wires, in addition to the unobvious ice prevention and removal effect, makes the weight of each blade increased by 200 kg, and the weight of the blades of the entire wind turbine generator are increased by 600 kg, which greatly increases the weight load of the wind turbine blade. When in use, a large amount of electric energy needs to be used, which increases the power consumption rate of the factory by more than 8-10%. At the same time, there are safety hazards that the blade is easily struck by lightning. Even if a monitoring system or a special lightning protection design is installed, the blade is still struck by lightning, there have been many events that the blade is struck by lightning to be scrapped due to installation of the electric heating deicing system. In a natural environment, the density of hot air is low, the density of cold air is large, the hot air with small density rises, the cold air with large density is decreased, and the hot air can only rise without the action of an external force other than horizontally diffuse or even under the cold air. After the heat of the electric heating is conducted to the surface of the blade, the hot air can only rise without the action of an external force instead of horizontally diffusing, and the heat cannot be horizontally conducted to the upper surface of the blade, thereby leading to icing of the blade without resistance wires or electro-thermal membranes. The hot air deicing system utilizes a blade shell material to deliver the heat to the outer surface of the blade, so that the surface of the blade has a certain temperature, the blade is indirectly heated under the thermal action so as to prevent the super-cooled water drops from being frozen and achieve the purpose of preventing and removing ices. However, as a main material of the wind turbine blade, a thermosetting polyester resin is extremely low in heat conducting property, the heat in the cavity of the blade is difficultly conducted to the surface of the blade in a short time, even if the hot gas is continuously transported to the cavity of the blade, and the deicing efficiency is extremely low. For large wind turbine blades, thermal resistance of the shell of the blade is obviously increased with the increase of the quality thickness of the blade, which means large-power blades need a higher internal temperature to achieve the deicing of the surface of the blade, and the deicing efficiency is gradually reduced with the increase of the size of the blade.

Whether a deicing system using electrical heating membranes or resistance wires for electrical heating or a deicing system using a hot air is adopted, they have the following common defects: ① if a blade is fails to deice, the entire deicing system must stop running, or else, weight unbalance and serious barycenter offset are caused by different icing quality of the blade so as to give rise to faults or accidents; ② the heating power of the blades of each wind turbine generator is more than 150-200 kw, and a large amount of electric energy needs to be consumed during the operation of the equipment so as to lead to a fact that the electricity consumption for wind turbine generation is additionally increased by more than 8%-10%; ③ modification of the blades or maintenance of equipment is difficultly implemented; ④ the equipment has a high failure rate and needs to be operated and maintained every year, and the service life of the equipment generally does not exceed 10 years; ⑤ most importantly, the wind turbine blade is made of a glass fiber enhanced composite consisting of thermosetting matrix materials such as polyester resin and has a use temperature range limitation of −40-50° C., so the heating temperature cannot exceed the operating temperature range specified by the blade material regardless of electrical heating deicing or hot gas deicing, it is inevitable to accelerate the fatigue of the blade material once heating is conducted for a long term at a temperature exceeding or being in the specified use temperature range of the blade so as to affect the overall strength of the blade or cause the blade to be damaged, and the heat generated by heating within the specified use temperature range is far less than the heat required for preventing and removing the ices on the blade.

The liquid ice prevention and removal and coating ice prevention and removal technical methods also have the following technical features: ① although a liquid for preventing and removing ices has low surface energy hydrophobicity or a coating has waterproof, anti-pollution, anti-oxidation and anti-corrosion properties and the like, the effective acting time of liquid ice prevention and removal is short and is a short-term ice prevention method, and the blade needs to be brushed once or even more every year and is often maintained, the blade is washed before brushing so as not to meet the long-term application requirements, and the deicing effect is worse in severe icing conditions, and even the icing prevention and removal effect cannot be realized; ② a wax, a fluorine-containing resin and other materials added in a fluorine-based ice prevention and removal material or bionic coating material can shorten the service life of the substrate of the wind turbine blade, affects and reduces a coating adhesion force and wear resistance. The PTFE in the fluorine-based ice prevention and removal material is poor in water solubility, and a water-soluble PTFE polymer is difficultly formed, it is needed to add additives such as an initiator and a thickener to form a membrane. The hydrophobic effects of the additives are poor so as not to achieve the surface effect of the hydrophobic membrane, a certain effect acts on the SS surface of the blade (rear edge, leeward side), but the ice prevention and removal effect of the PS surface (front edge, windward side) of the blade is extremely poor, the quality of icing is at most reduced by about 20%, and furthermore the ice prevention and removal time is short, the property is obviously degraded and aged, and the validity period is generally no more than 2 years.

SUMMARY

In order to solve the above technical problems, the disclosure provides a preparation method of a PTFE-based membrane for preventing and removing ices, comprising the following steps.

(1) preparing a membrane rod material by blending, pre-compressing and pushing a PTFE resin is infiltrated with vinyl silicone oil, a mass ratio of vinyl silicone oil to PTFE resin is (2-3):100, blending is conducted at room temperature to prepare a blended resin powder based on fusion polymerization of PTFE resin+vinyl silicone oil monomers; the blended resin powder is pre-compressed in a pre-compressing material barrel at the temperature of 60-90° C. under the pressure of 5-8 MPa to prepare a monomer polymerized blank rod material based on PTFE monomer fusion polymerization; the blank rod material based on PTFE monomer fusion polymerization is subjected to hot pushing in a hot pushing material barrel at the temperature of 60-90° C. under the pressure of 5-8 MPa to prepare a membrane rod material based on PTFE monomer fusion polymerization.

(2) preparing a membrane by hot calendaring the prepared membrane rod material based on PTFE monomer fusion polymerization is subjected to micro-scale polymerization hot calendaring in a hot calendaring machine, a gap distance between two upper and lower oil pressure calendaring rollers of the hot calendaring machine is set as a thickness of a membrane based on PTFE monomer polymerization to be prepared, the temperatures of the calendaring rollers are 60-90° C., the membrane rod material based on PTFE monomer fusion polymerization is extruded from the gap between the calendaring rollers at the rate of 20-30 m/min under the clockwise rotation of the calendaring rollers while uniformly extending toward two sides under the action of temperature and hot calendaring stretching, the membrane is split to generate a fabric-like structure after laminar exfoliation to prepare a homogeneous PTFE-based membrane with a set thickness.

a contact angle between water beads and the surface of the membrane is 115.89°-125.46°, the surface morphology of the membrane is exhibited as a micro concave-convex structure with an average size of 10-20 um, a height of 8-10 um and a spacing of 20-30 um, which can be uniformly distributed in a longitude and latitude direction.

The disclosure has the technical effects: prevention and removal of ices on the wind turbine blades in winter cannot meet the ice prevention and removal effect and cannot achieve the ice prevention and removal efficiency requirements under the environment of the wind farm by only utilizing a low surface tension and high lubricating property of PTFE. On the basis of sufficiently utilizing the low surface tension and high lubricating property of the PTFE-based material itself, the PTFE-based concave-convex geometric ultra-structure morphology with multiple nano and micro dimensions is prepared, so that the surface of the membrane has an ultra-low surface tension and non-adhesion properties, and ices are difficultly pasted on the surface of the membrane, or even though the adhesion is formed, ices can be automatically separated from the surface of the membrane with only a very low adhesion force, and then the effect and purpose of truly preventing and removing the ices on the surface of the wind turbine blade are achieved.

Another objective of the disclosure is to provide use of a PTFE-based membrane for preventing and removing ices covering wind turbine blades, wherein when the PTFE-based membrane is applied to the blades of the wind turbine in operation for high-altitude membrane pasting, the tip of the blade is perpendicular to the ground and parallel to the tower body of the wind turbine, the blade penetrates through a high-altitude hanging basket, the adhesion of the membrane adopts a cutting, splicing and pasting method and a winding and pasting method which are performed simultaneously by four people, one of the four people is in charge of spreading the membrane and aligning a pasting reference line, one of the four people is in charge of finishing the smoothness of the membrane when being pasted, one of the four people is in charge of eliminating air between the membrane and a blade base layer and bonding with a pasting scraper, and one of the four people is in charge of cooperation between logistics services and construction. A membrane pasting process is similarly suitable for wind turbine blades which are not in operation, specifically comprising:

(1) polishing the surface of the blade the flatness and finish degree of the blade surface are treated with a hand-held polishing machine, and meanwhile a part of aged coating pasted on a base layer surface is removed, so as to meet the pasting requirement conditions of the PTFE-based nano functional composite membrane; and (2) pasting the membrane 1) cutting, splicing and pasting the tip of the blade the membrane is cut horizontally along the angle of attack, deflection and curvature of the airfoil starting from the front edge of the tip of the blade according to the width of the membrane, each membrane is cut separately into a membrane conforming to the airfoil, angle of attack, deflection and size, and then the cut membrane is pasted;

when the membrane is pasted, the membrane is pasted from the SS surface of the rear edge to the PS surface of the front edge, the membrane on the PS surface of the front edge must be overlapped on the membrane on the SS surface of the rear edge, the two membranes must be horizontally staggered to be overlapped and are not arranged at the same position;

2) winding and pasting when the airfoil, chord length, deflection, curvature, and angle size of the blade are suitable for winding and pasting, pasting is performed by using a manner that the membrane is horizontally wound on the blade, when the membrane is wound and pasted, the membrane is spread, the release paper on the surface is torn off, and the membrane penetrates between the clamp rollers of a membrane pasting tool, a tension force is applied to the membrane by pulling via hands, and the release paper is torn off while the membrane is wound and pasted;

the vertical and horizontal edge of the last membrane pasted on the tip of the blade is used as a winding and pasting reference line, and the membrane is slowly spread for winding and pasting by aligning the reference line, and air between the membrane and the base layer is uniformly removed using a membrane pasting scraper according to the width of the whole membrane from the starting portion to the rear of the pasted surface, namely, a membrane non-spread direction, while the membrane is forcefully and firmly pasted on the surface of the blade, and the air between the membrane and the base layer must be thoroughly removed; overlapping of the membrane on the upper layer presses the overlapping surface of the overlapping part of the membrane on the lower layer, namely, the wound and pasted membrane must be overlapped on the pasted membrane of the tip of the blade, and all the horizontal overlaps of the membrane, namely, the linkers between the membranes are all arranged on the SS surface of the rear edge of the blade;

3) treating the membrane at the lightning arrester of the blade the membrane is directly covered and pasted from the surface of the lightning arrester, before the pasting of the whole membrane is ended, the membrane covering the lightning arrester is cut and dug out one by one to expose the lightning arrester, and the membrane at the seam is compacted and flattened;

4) overlapping of the membrane and treatment of the linker whether the pasting at the overlapping position is tight is carefully checked, and if the overlapping is not tight, compaction and flattening is timely performed, so as to avoid wrinkling, bulging, blistering, and unevenness;

5) repairing the damaged membrane if the membrane is scratched during the construction, a membrane with the whole width is cut, and horizontally wound and pasted on the surface of the whole scratched part for repairing.

In the previous use of the PTFE-based membrane for preventing and removing ices covering wind turbine blades, when the tip of the blade is subjected to cutting, splitting and pasting, the horizontal overlapping thickness of the membrane is 150-200 mm, the edge of the adhered first membrane is taken as a reference line, the second membrane is overlapped and pressed on the 10 mm-40 mm edge of the first membrane, the two membranes are longitudinally overlapped by 10 mm-40 mm.

In the previous use of the PTFE-based membrane for preventing and removing ices covering wind turbine blades, when winding pasting is performed on the tip of the blade, an overlapping width between the membranes is 10-40 mm.

In the previous use of the PTFE-based membrane for preventing and removing ices covering wind turbine blades, when cutting and splicing pasting and winding pasting are performed on the tip of the blade, the membrane is forbidden to be forcefully and horizontally stretched to avoid that the membrane is shrunk after being stretched and the membrane must be pasted under the natural and smooth state.

In the previous use of the PTFE-based membrane for preventing and removing ices covering wind turbine blades when cutting and splicing pasting and winding pasting are performed on the tip of the blade and when the membrane is wrinkled and hollowed or the membrane is irregular or deformed due to no alignment of the reference line, the whole non-spread membrane slowly lifts until wrinkling and hollowing occur, and then the membrane is re-pasted to prevent the pasting quality of the membrane from being influenced.

The disclosure has the beneficial effects:
(1) the properties of low surface tension and high lubricating property of PTFE itself are utilized to achieve the non-adhesion purpose, and the membrane is prepared into a concave-convex geometric ultra-structure surface morphology with nano and micro dimensions so that the membrane has more ultra-low surface solid tension, better hydrophobicity, higher non-adhesion and high anti-fouling property, and the surface of the membrane has a self-cleaning function at the same time, which is incomparable to other measures;
(2) aiming at characteristics of application environments of wind farms and wind turbine generator blades, a construction technology process based on a preparation method and engineering application of a PTFE-based nano functional composite membrane is designed, which makes engineering application more feasible, operable and convenient.

DETAILED DESCRIPTION

Example 1

A preparation method of a PTFE-based membrane provided in this example comprises the following steps:
(1) preparing a membrane rod material by blending, pre-compressing and pushing a PTFE resin was infiltrated with vinyl silicone oil, a mass ratio of vinyl silicone oil to PTFE resin was 2.5:100, the vinyl silicone oil generated an affinity group with the PTFE diffusion resin, promoted the PTFE diffusion resin to generate an adhesion affinity force with polyester adhering glue, blending was conducted at room temperature, a blended resin powder was prepared by fusion polymerization of PTFE resin+vinyl silicone oil monomers; the blended resin powder was pre-compressed in a pre-compressing material barrel at the temperature of 60° C. under the pressure of 5 MPa to prepare a monomer polymerized blank rod material based on PTFE monomer fusion polymerization; the blank rod material based on PTFE monomer fusion polymerization was subjected to hot pushing in a hot pushing material barrel at the temperature of 60° C. under the pressure of 8 MPa to prepare a Φ17 mm membrane rod material based on PTFE monomer fusion polymerization.

Figure 1:
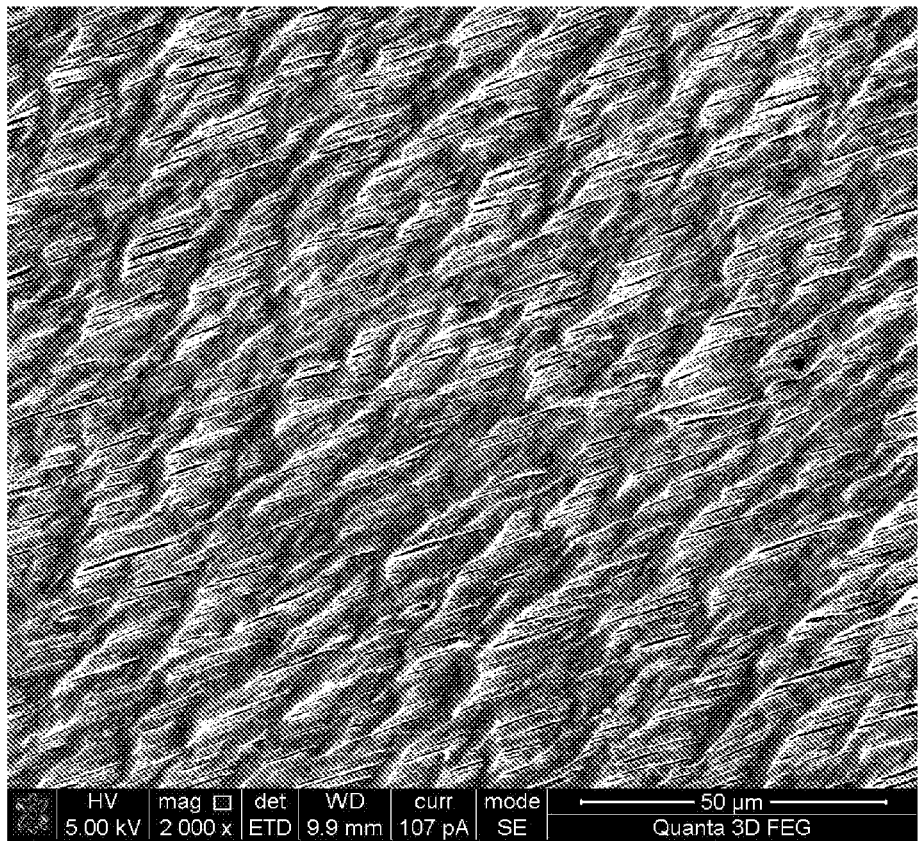
FIG. 1 shows a nano and micro concave-convex geometric ultra-structure morphology of a surface of a membrane under a scanning electron microscope (SEM).
Figure 2:
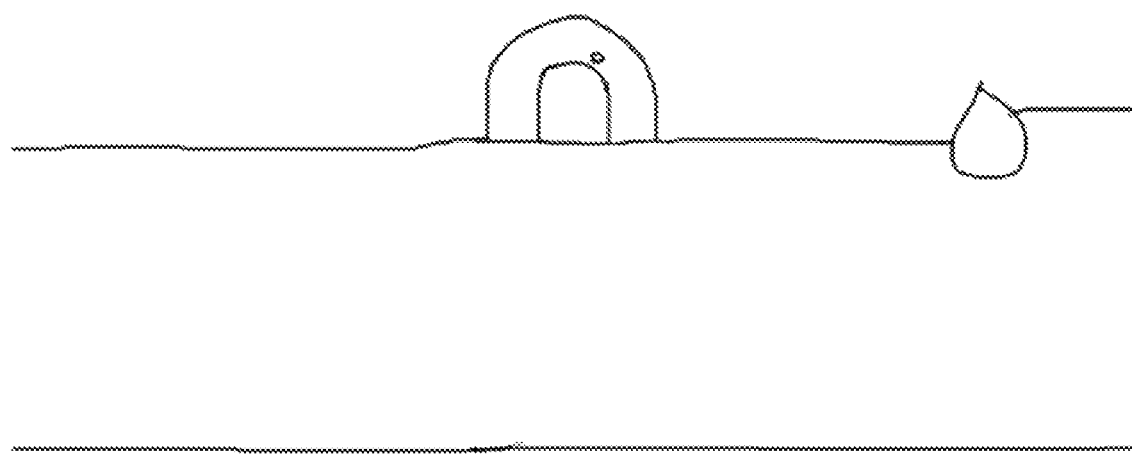
FIG. 2 shows a membrane surface-water contact angle under a KRUSS DSA-100 contact angle tester.

(2) preparing a membrane by hot calendaring the prepared membrane rod material based on PTFE monomer fusion polymerization was subjected to microscale polymerization hot calendaring in a hot calendaring machine, a gap distance between two upper and lower oil pressure calendaring rollers of the hot calendaring machine was set as a thickness (such as 80 um, 100 um or 120 um) required for the membrane based on PTFE monomer polymerization, the temperatures of the calendaring rollers were 60° C., the Φ17 mm membrane rod material based on PTFE monomer fusion polymerization was extruded from the gap between the calendaring rollers at the rate of 25 m/min under the clockwise rotation of the calendaring rollers while uniformly extending toward two sides under the action of temperature and hot calendaring stretching, and the membrane is split to generate a fabric-like structure after laminar exfoliation to prepare a homogeneous PTFE-based membrane with a set thickness.

the density of the PTFE-based membrane was 2.1 kg/m3, as shown in FIG. 2, a contact angle between water beads and the surface of the membrane is 115.89°-125.46°, as shown in FIG. 1, the surface morphology of the membrane was exhibited as a micro concave-convex structure with an average size of 15 um, a height of 9 um and a spacing of 15 um under the stereo imaging of a scanning electron microscope, which can be uniformly distributed in a longitude and latitude direction.

Various properties of 5 PTFE membrane samples prepared by the above method were tested. Results are as follows: ① the average thickness of the membrane is 100 um; ② the average weight of the membrane is 210 g/m2; ③ the adhesive peel strength is 50 N, and 180° adhesive peel strength is 1000 N/m; ④ through a 14400 h xenon lamp aging test, a freeze-thaw cycle performance test (temperature: −60° C.-150° C., humidity: 5-98%), an ozone aging test, an ultraviolet aging test, an artificial atmosphere corrosion and sea salt solution immersion test, the average tensile strength before and after aging is 25 MPa, the average elongation is more than 90%, and no aging phenomenon occurs; ⑤ by using the GB/T 9266-2009 "Determination of the Washability of Building Exterior Wall Coatings", after 37 times/min cyclic reciprocating friction for 40,000 times, there is no roughness on the surface of the membrane, no damage to exposed substrate was observed, and wear resistance is strong; ⑥ a dynamic wind pressure test platform is used to simulate the wind speed of 36.9 m/s (12-level typhoon) to test rain wash resistance, and there is no roughness on the surface of the membrane through 1000 h strong wind speed blowing water test, and the membrane has a good rain erosion property; ⑦ as shown in FIG. 1, the surface morphology of the membrane is tested by scanning electron microscope (SEM), and the surface morphology of the membrane is exhibited as a micro concave-convex structure with an average size of 20-40 um, a height of 10-20 um and a spacing of 30-50 um, which can be uniformly distributed in a longitude and latitude direction; ⑧ as shown in FIG. 2, the contact angle between the membrane surface and the water drops measured by a water contact angle tester is between 115.89° and 125.46°; ⑨ the average surface roughness of the membrane measured by a surface roughness meter is 0.18 um.

Example 2

Figure 3A:
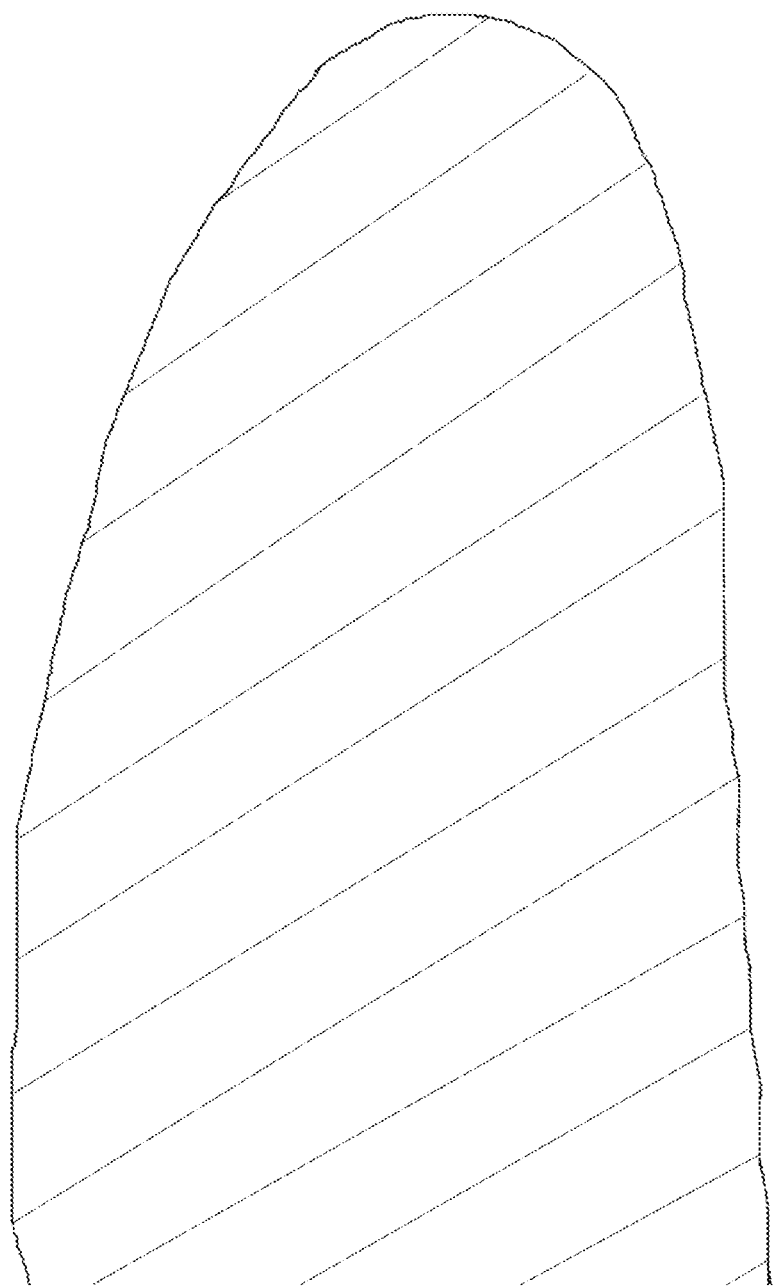
FIG. 3a-FIG. 3f show an engineering application method on a wind turbine generator blade.

This example provides use of a blade of a wind turbine in operation in example 1. According to the features of the chord length, deflection and curvature of the airfoil of the wind turbine blade and convenience of engineering construction, the tip of the blade is perpendicular to the ground and parallel to the tower body of the wind turbine, the blade penetrates through a high-altitude hanging basket, the adhesion of the membrane adopts a cutting, splicing and pasting method and a winding and pasting method which are performed simultaneously by four people, one of the four people is in charge of spreading the membrane and aligning a pasting reference line, one of the four people is in charge of finishing the smoothness of the membrane when being pasted, one of the four people is in charge of eliminating air between the membrane and a blade base layer and bonding with a pasting scraper, and one of the four people is in charge of cooperation between logistics services and construction. The process and method of the adhesion of the membrane are similarly suitable for blades of a wind turbine which is not in operation, specifically comprising:

(1) polishing the surface of the blade the flatness and finish degree of the blade surface were treated with a hand-held polishing machine, and meanwhile a part of aged coating pasted on a base layer surface was removed, so as to meet the pasting requirement conditions of the PTFE-based nano functional composite membrane; and (2) pasting the membrane 1) cutting, splicing and pasting the tip of the blade as shown in FIG. 3a, the membrane was cut horizontally along the angle of attack, deflection and curvature of the airfoil starting from the front edge of the tip of the blade according to the width of the membrane, each membrane was cut separately into a membrane conforming to the airfoil, angle of attack, deflection and size, and then the cut membrane was pasted.

when in adhesion, the membrane was pasted from the SS surface (leeward side) of the rear edge to the PS surface (windward side) of the front edge, the membrane on the PS surface of the front edge was overlapped on the membrane on the SS surface of the rear edge, the two membranes were horizontally overlapped and staggered by 15 cm and were not arranged at the same position; the horizontal overlapping thickness of the membrane was 150-200 mm, the edge of the adhered first membrane was taken as a reference line, the second membrane was overlapped and pressed on the 10 mm-40 mm edge of the first membrane, the two membranes were longitudinally overlapped by 10 mm-40 mm, and so on, inverted flashing of the membrane on the blades was not formed.

Figure 3B:
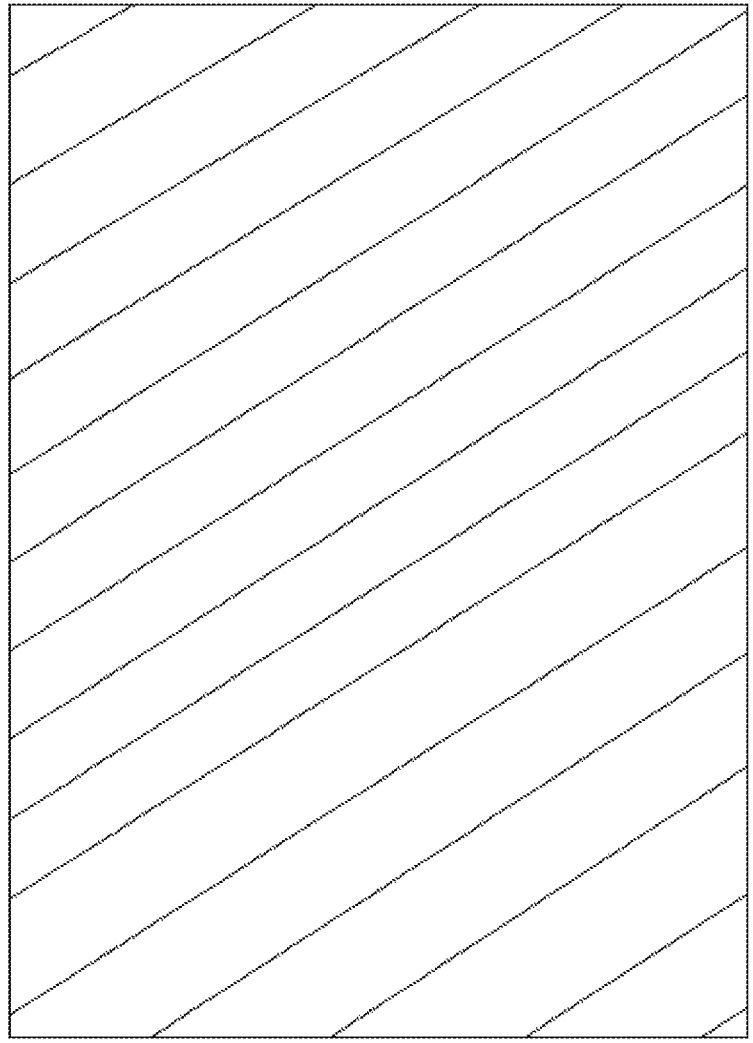
Figure 3C:
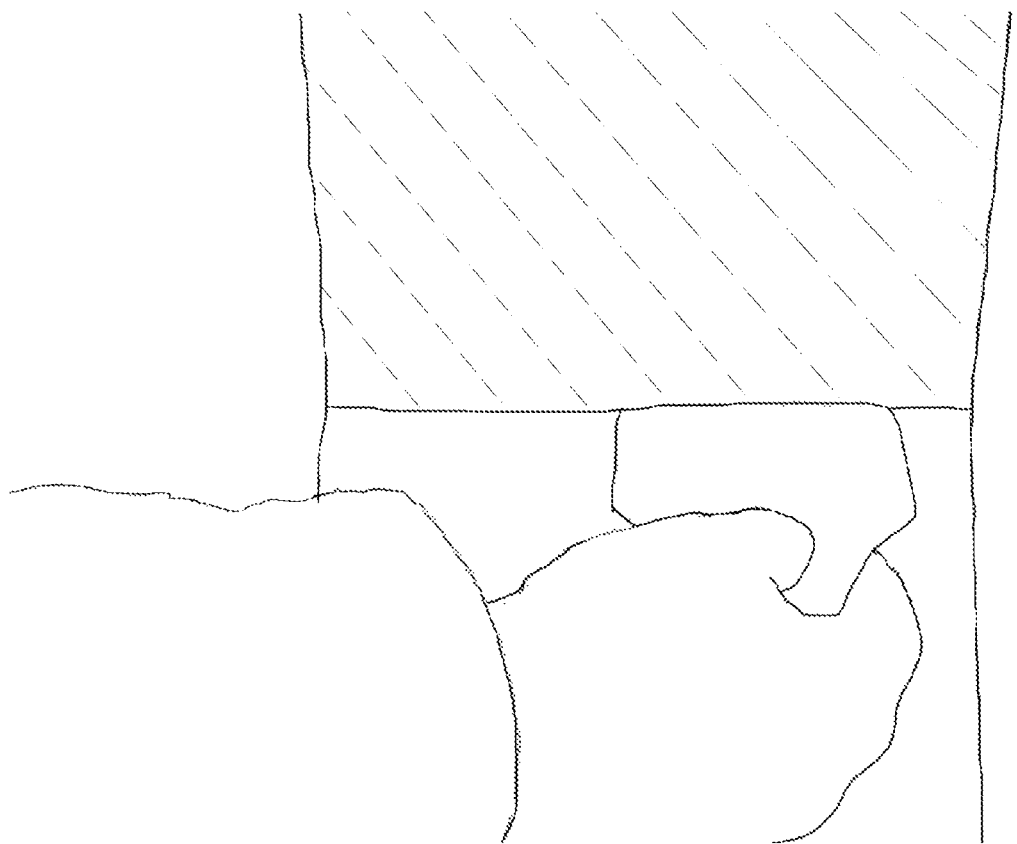
Figure 3D:
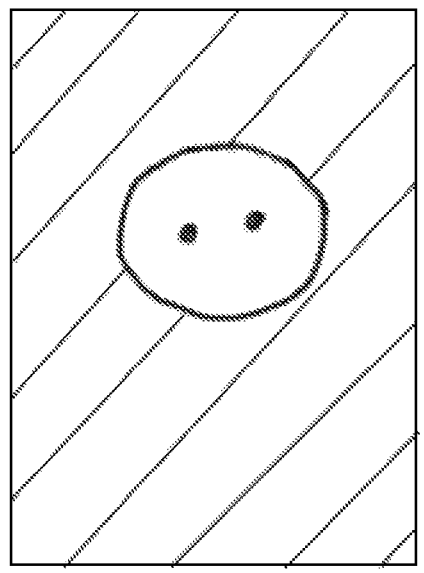
Figure 3E:
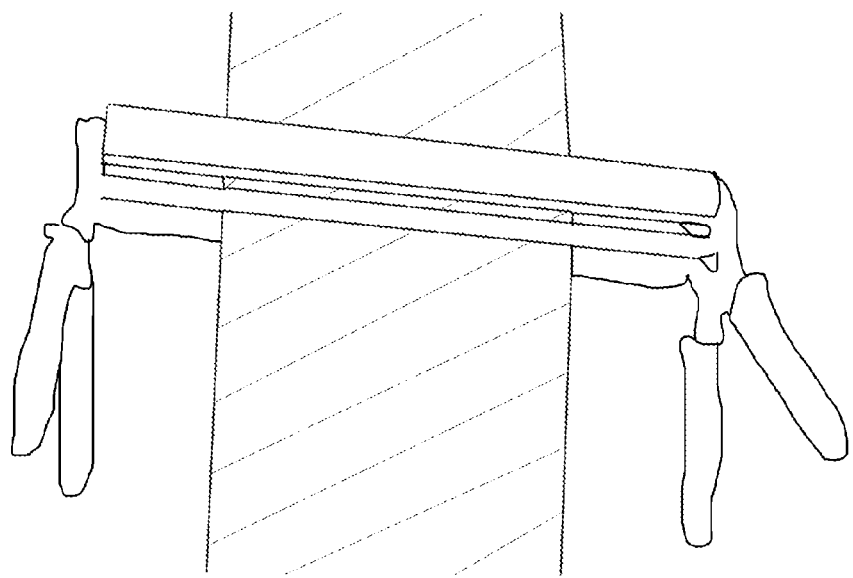
Figure 3F:
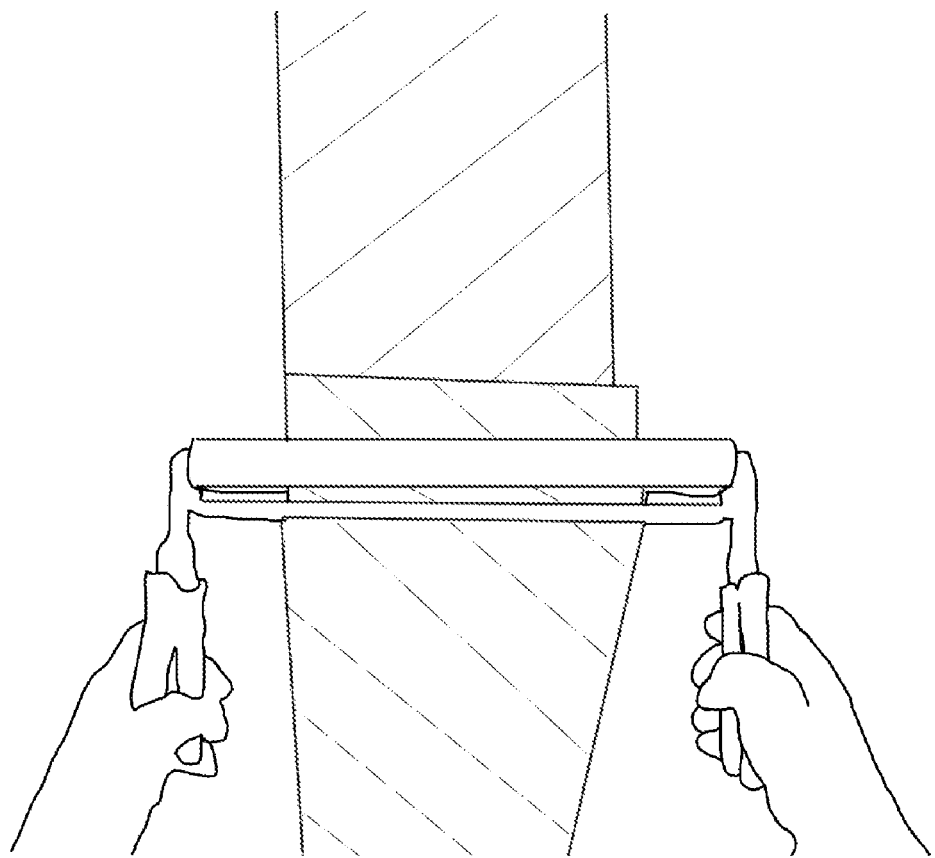

2) winding and pasting as shown in FIGS. 3b and 3c, at a 5 cm position from the tip of the blade to the middle of the blade, when the airfoil, chord length, deflection, curvature, and angle size of the blade were suitable for winding and pasting, and pasting was performed by using a manner that the membrane was horizontally wound on the blade.

as shown in FIGS. 3e and 3f, when the membrane was wound and pasted, the membrane was spread by 200 mm, the release paper on the surface was torn off, and the membrane penetrated through the clamp rollers of a membrane pasting tool, a tension force was applied to the membrane by pulling via hands, and the release paper was torn off while the membrane was wound and pasted.

the vertical and horizontal edge of the last membrane pasted on the tip of the blade was used as a winding and pasting reference line, and the membrane was slowly spread for winding and pasting by aligning the reference line, and air between the membrane and the base layer was uniformly removed using a membrane pasting scraper according to the width of the whole membrane from the starting portion to the rear of the pasted surface, namely, a membrane non-spread direction, while the membrane was forcefully and firmly pasted on the surface of the blade, and the air between the membrane and the base layer must be thoroughly removed; overlapping of the membrane on the upper layer pressed the overlapping surface of the overlapping part of the membrane on the lower layer, the overlapping thicknesses of the upper and lower two layers of membranes were 10 mm, namely, the wound and pasted membrane must be overlapped on the pasted membrane of the tip of the blade, and all the horizontal overlaps of the membrane, namely, the linkers between the membranes were all arranged on the SS surface of the rear edge of the blade.

3) treating the membrane at the lightning arrester of the blade as shown in FIG. 3d, the membrane was directly covered and pasted from the surface of the lightning arrester, before the pasting of the whole membrane was ended, the membrane covering the lightning arrester was cut and dug out one by one to expose the lightning arrester, and the membrane at the seam was compacted and flattened.

4) overlapping of the membrane and treatment of the linker whether the pasting at the overlapping position was tight was carefully checked, and if the overlapping was not tight, compaction and flattening was timely performed, so as to avoid wrinkling, bulging, blistering, and unevenness.

5) repairing the damaged membrane if the membrane was scratched during the construction, a membrane with the entire width was cut, and horizontally wound and pasted on the surface of the whole scratched part for repairing.

In the above pasting process, the membrane was strictly forbidden to be horizontally stretched to avoid that the membrane was wrinkled after being stretched, the membrane must be pasted in a natural and smooth state. When wrinkling and hollowing occurred or the membrane was not smooth or deformed without aligning the reference line, the whole membrane that was not spread should be slowly lifted to a position where wrinkling and hollowing occurred, and then was pasted again, so as not to affect the pasting quality of the membrane.

In the disclosure, the membrane is prepared into a concave-convex geometric ultra-structure surface morphology with nano and micro dimensions on the basis of sufficiently utilizing the low surface tension and high lubricating property of the PTFE-based material by using monomer fusion polymerization and micro polymerization technology methods, so that the membrane has more ultra-low surface solid tension, better hydrophobicity, higher non-adhesion property and high anti-fouling property on the basis of having a high lubricating surface.

In addition to the above examples, other embodiments can also belong to the disclosure. Technical solutions formed by equivalent replacements or equivalent transformations are all included within the protective scope of the disclosure.

What is claimed is:

1. A method of making a polytetrafluoroethylene (PTFE)-based membrane for preventing and removing ice covering wind turbine blades, comprising the following steps:

infiltrating PTFE resin powder with vinyl silicone oil, wherein a mass ratio of the vinyl silicone oil to the PTFE resin is (2-3):100, blending the PTFE resin powder and the vinyl silicone oil at room temperature to prepare a blended resin powder, pre-compressing the blended resin powder in a pre-compressing material barrel at a temperature of 60-90° C. under a pressure of 5-8 MPa and fusion polymerizing the PTFE resin and vinyl silicone oil monomers to prepare a monomer polymerized blank rod material, hot pushing the monomer polymerized blank rod material in a hot pushing material barrel at a temperature of 60-90° C. under a pressure of 5-8 MPa to prepare a membrane rod material, subjecting the prepared membrane rod material to microscale polymerization hot calendering in a hot calendering machine, wherein a gap distance between upper and lower oil-heated pressure calendering rollers of the hot calendering machine is set as a thickness of a membrane to be prepared, and temperatures of the calendering rollers are 60-90° C., and extruding the membrane rod material through the gap between the calendering rollers at a rate of 20-30 m/min under a rotation of the calendering rollers while uniformly extending the membrane rod material toward two sides of the hot calendering machine under an action of temperature and hot calendering stretching, wherein the membrane is split to generate a structure resembling a fabric after laminar exfoliation of the membrane to prepare a homogeneous PTFE-based membrane with a set thickness, wherein a contact angle between water beads and a surface of the membrane is 115.89°-125.46°, a surface morphology of the membrane is exhibited as a micro concave-convex structure with an average size of 10-20 micrometers, a height of 8-10 micrometers and a spacing of 20-30 micrometers, which is uniformly distributed in longitudinal and latitudinal directions.

2. A method of applying a PTFE-based membrane for preventing and removing ice covering wind turbine blades made according to the process of claim 1, comprising:

polishing a surface of a wind turbine blade with a handheld polishing machine to remove a part of aged coating pasted on a base layer surface of the blade and to provide the base layer of the blade with a flatness and finish degree, so as to meet pasting requirement conditions of the PTFE-based membrane;

cutting a plurality of membranes horizontally along an angle of attack, a deflection and a curvature of an airfoil starting from a front edge of a tip of the blade according to a width of each membrane, wherein each membrane is cut separately to conform to the airfoil, the angle of attack, the deflection and a size of the blade;

pasting each membrane from an SS surface of a rear edge of the blade to a PS surface of a front edge of the blade, wherein a membrane on the PS surface of the front edge is overlapped on a membrane on the SS surface of the rear edge, and membrane overlaps are horizontally staggered;

horizontally winding a plurality of wound membranes on the blade, wherein winding each respective wound membrane is performed while removing a release paper on a surface of the respective wound membrane, directing the respective wound membrane between clamp rollers of a membrane pasting tool, and pulling the pasting tool to apply a tension force to the respective wound membrane;

wherein horizontally winding further comprises:

using a vertical and a horizontal edge of a last wound membrane pasted on the tip of the blade as a winding and pasting reference line, slowly spreading a respective wound membrane for winding and pasting by aligning the respective wound membrane with the reference line, removing air between the respective wound membrane and the base layer uniformly using a membrane pasting scraper according to a width of the whole respective wound membrane from a starting portion to a rear of a pasted surface of the respective wound membrane in a non-spread direction, forcefully and firmly pasting the respective wound membrane on the surface of the blade while the air between the respective wound membrane and the base layer is removed, and horizontally overlapping the respective wound membrane on a pasted membrane on the tip-of the blade, wherein all horizontal overlaps of the wound membranes are arranged on the SS surface of the rear edge of the blade;

cutting and digging out a pasted membrane at a lightning arrester of the blade to expose the lightning arrester, and compacting and flattening the pasted membrane;

carefully checking each membrane overlap, and if a respective membrane overlap is not tight, compacting and flattening the respective membrane overlap so as to avoid wrinkling, bulging, blistering, and unevenness; and if a membrane portion is scratched during construction, cutting a whole width membrane, and horizontally winding and pasting the whole width membrane on a surface of the whole scratched portion to repair the scratched portion.

3. The method according to claim 2, wherein an overlapping width between respective wound membranes is 10-40 mm in the horizontally overlapping step.

4. The method according to claim 2, wherein the horizontally staggered membrane overlaps are overlapped by 150-200 mm, the horizontal wound membrane overlaps are overlapped in a longitudinal direction by 10-40 mm, and a second membrane is longitudinally overlapped and pressed on an 8-10 mm edge of a first membrane by taking a 8-10 mm overlapped edge of the first membrane as a reference line.

5. The method according to claim 4, wherein each membrane is applied without forceful and horizontal stretching to avoid shrinking of a respective membrane after being stretched, and each membrane is pasted in a smooth state.

6. The method according to claim 4, wherein when a pasted membrane is wrinkled and hollowed or the pasted membrane is irregular or deformed due to non-alignment with the reference line, a whole non-spread part of the pasted membrane is slowly lifted, and then the membrane part is re-pasted to prevent a pasting quality of the membrane part from being influenced.

* * * * *